United States Patent [19]
Duerr

[11] 3,923,854
[45] Dec. 2, 1975

[54] DERIVATIVES OF THIOCARBAMIC ACID, THEIR MANUFACTURE AND THEIR USE FOR COMBATING INSECTS AND REPRESENTATIVES OF THE ORDER ACARINA

[75] Inventor: Dieter Duerr, Bottmingen, Switzerland

[73] Assignee: Ciba-Geigy AG, Basel, Switzerland

[22] Filed: May 4, 1970

[21] Appl. No.: 34,561

[30] Foreign Application Priority Data
May 8, 1969  Switzerland.......................... 7084/69

[52] U.S. Cl............... 260/455 A; 260/454; 424/300
[51] Int. Cl.[2]......................................... C07C 153/11
[58] Field of Search................. 260/455 A; 424/300

[56]  References Cited
UNITED STATES PATENTS

| | | | |
|---|---|---|---|
| 2,863,899 | 12/1958 | Harris............................. | 260/455 A |
| 3,061,624 | 10/1962 | Ludvik et al...................... | 424/300 |
| 3,098,001 | 7/1963 | Werres et al. ................... | 260/455 A |
| 3,203,949 | 8/1965 | Hopkins et al.................. | 260/207.1 |

FOREIGN PATENTS OR APPLICATIONS

| | | | |
|---|---|---|---|
| 1,288,262 | 2/1962 | France............................ | 260/455 A |

OTHER PUBLICATIONS

Freund et al., "Acaricides" (1962) CA 59 p. 2120 (1963).

Beaver et al., "The Prep. & Bact. Activity of Halogenated Carbamilates" (1962) J. Med. Chem. 6 pp. 501-506 (1963).

Noguchi et al., "Selective Toxicity etc.," (1968) CA 69 No. 76987x (1968).

*Primary Examiner*—Glennon H. Hollrah
*Attorney, Agent, or Firm*—Frederick H. Rabin; Joseph G. Kolodny; Harry Goldsmith

[57]  ABSTRACT

Thiocarbamic acid compounds of the formula

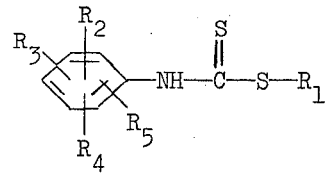

wherein $R_1$ represents alkyl, alkenyl or alkinyl radicals, $R_2$ represents an alkyl radical, $R_3$ and $R_4$ represent hydrogen or halogen and $R_5$ represents hydrogen or an alkyl radical; their manufacture and their use for combating insects and representatives of the order Acarina.

9 Claims, No Drawings

DERIVATIVES OF THIOCARBAMIC ACID, THEIR MANUFACTURE AND THEIR USE FOR COMBATING INSECTS AND REPRESENTATIVES OF THE ORDER ACARINA

The present invention relates to derivatives of thiocarbamic acid, their manufacture and their use for combating insects and representatives of the order Acarina. The compounds according to the invention correspond to the formula

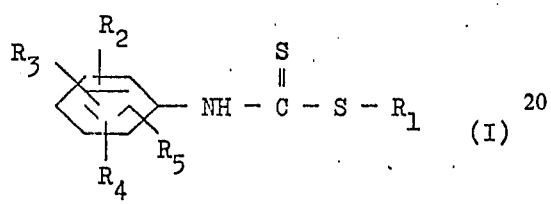

wherein $R_1$ represents alkyl, alkenyl, or alkinyl radicals, $R_2$ represents an alkyl radical, $R_3$ and $R_4$ represent hydrogen or halogen and $R_5$ represents hydrogen or an alkyl radical.

The alkyl, alkenyl and alkinyl radicals can be branched or straight-chain, unsubstituted or for example substituted by halogen, CN, OH and/or $NH_2$ or alkylamino groups, and interrupted by —O—, —S— or —NH—. These radicals possess 1 to 10, but especially 1 to 4, carbon atoms. By halogen, F, Cl, Br and I, especially Cl and Br, are to be understood.

Compounds which are particularly suitable according to the invention correspond to the formula

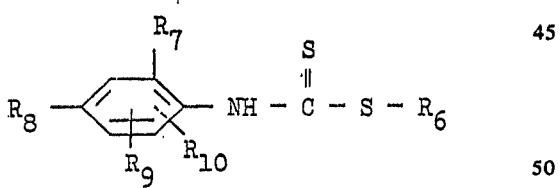

wherein $R_6$ represents substituted or unsubstituted $C_1$ to $C_4$ alkyl or $C_2$ to $C_4$ alkenyl which are interrupted by —S— or —O—, especially halogenalkyl or halogenalkenyl radicals, $R_7$ represents methyl or ethyl groups, $R_8$ represents chlorine or bromine and $R_9$ and $R_{10}$ represent hydrogen, chlorine, bromine or $C_1$ to $C_4$ alkyl.

As examples of such compounds, the following may be quoted:

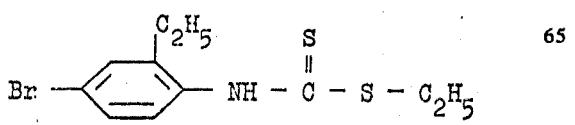

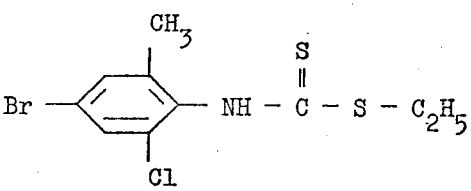

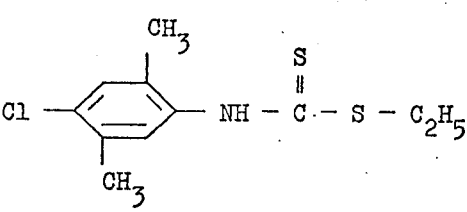

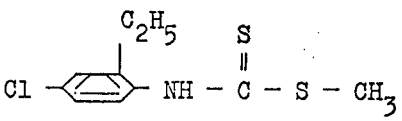

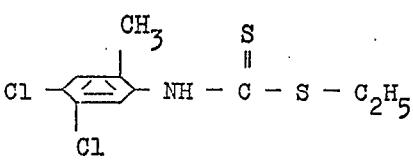

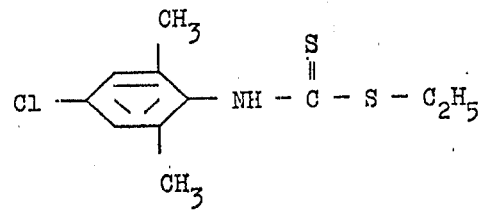

The compounds of formula (I) are manufactured according to methods which are in themselves known, for example by reaction of an aniline of formula

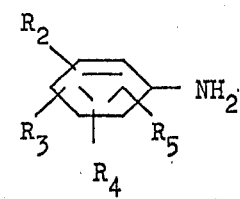

with carbon disulphide and subsequent esterification of the resulting dithiocarbamic acid with a dialkylsulphate of formula $(R_1)_2 SO_4$ or by reaction of a phenylisothiocyanate of formula

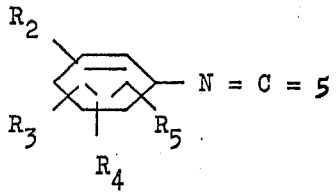

with a mercaptan of formula R₁SH in the presence of a small amount of triethylamine. In the abovementioned formulae, $R_1$ to $R_5$ have the significance indicated for formula I.

The compounds of formula (I) are suitable for combating insects and representatives of the order Acarina, such as for example mites and ticks, as well as all their stages of development, such as eggs, larvae and pupae. Their effect against ectoparasites on animals, such as for example against *Boophilus microplus*, *Psoroptes ovis* or *Dermanyssus gallinae*, against lice on plants, especially shield-backed lice (Coccidae and Diaspididae) or against the rice-stem borer (*Chilo supressalis*) is particularly advantageous.

The active substances of formula (I) can be employed by themselves or together with a suitable carrier and/or additives. Suitable carriers and additives can be solid or liquid and correspond to the substances which are customary in formulation technology, such as, for example, natural or regenerated substances, solvents, dispersing agents, wetting agents, adhesives, thickeners, binders and/or fertilisers. Furthermore, additional insecticidally or acaricidally active compounds can also be added, such as, for example

PHOSPHORIC ACID DERIVATIVES

Bis-o,o-diethylphosphoric acid anhydride (TEPP)
O,O,O,O-Tetrapropyldithiopyrophosphate
Dimethyl(2,2,2-trichloro-1-hydroxyethyl)phosphonate (TRICHRORFON)
1,2-Dibromo-2,2-dichlorethyldimethyldimethylphosphate (NALED)
2,2-Dichlorovinyldimethylphosphate (DICHLORFOS)
2-Methoxycarbamyl-1-methylvinyldimethylphosphate (MEVINPHOS) Dimethyl-1-methyl-2-(methylcarbamoyl)vinylphosphate cis (MONOCROTOPHOS)
3-(Dimethoxyphosphinyloxy)-N-methyl-N-methoxy-cis-crotonamide
3-(Dimethoxyphosphinyloxy)-N,N-dimethyl-cis-crotonamide (DICROTOPHOS)
2-Chloro-2-diethylcarbamoyl-1-methylvinyldimethyl-phosphate (PHOSPHAMIDON)
O,O-Diethyl-O(or S)-2-(ethylthio)-ethylthiophosphate (DEMETON)
S-Ethylthioethyl-O,O-dimethyl-dithiophosphate (THIOMETON)
O,O-Diethyl-S-ethylmercaptomethyldithiophosphate (PHORATE)
O,O,-Diethyl-S-2-[(ethylthio)ethyl]dithiophosphate (DISULFOTON)
O,O-Dimethyl-S-2-(ethylsulphinyl)ethylthiophosphate (OXYDEMETONMETHYL)
(O,O-Dimethyl-S-(1,2-dicarbethoxyethyl)dithiophosphate (MALATHION)
(O,O,O,O-Tetraethyl-S,S'-methylene-bis-[dithiophosphate] (ETHION)
O-Ethyl-S,S-dipropyldithiophosphate
O,O-Dimethyl-S-(N-methyl-N-formylcarbamoylmethyl)-dithiophosphate (FORMOTION)
O,O-Dimethyl-S-(N-methylcarbamoylmethyl)dithiophosphate (DIMETHAT)
O,O-Dimethyl-S-(N-ethylcarbamoylmethyl)dithiophosphate (ETHOATMETHYL)
O,O-Diethyl-S-(N-isopropylcarbamoylmethyl)-dithiophosphate (PROTHOAT)
S-N-(1-Cyano-1-methylethyl)carbamoylmethyldiethylthiolphosphate (CYANTHOAT)
S-(2-Acetamidoethyl)-O,O-dimethyldithiophosphate
Hexamethylphosphoric acid triamide (HEMPA)
O,O-Dimethyl-O-p-nitrophenylthiophosphate (PARATHION-METHYL)
O,O-Diethyl-O-p-nitrophenylthiophosphate (PARATHION)
O-Ethyl-O-p-nitrophenylthiophosphonate (EPN)
O,O-Dimethyl-O-(4-nitro-m-tolyl)thiophosphate (FENITROTHION)
O,O-Dimethyl-O-(2-chloro-4-nitrophenyl)thiophosphate (DICAPTHON)
O,O-Dimethyl-O-p-cyanophenylthiophosphate (CYANOX)
O-Ethyl-O-p-cyanophenylphenylthiophosphonate
O,O-Diethyl-O-2,4-dichlorophenylthiophosphate (DICHROFENTHION)
O-2,4-Dichlorophenyl-O-methylisopropylamidothiophosphate
O,O-Dimethyl-O-2,4,5-trichlorophenylthiophosphate (RONNEL) O-Ethyl-O-2,4,5-trichlorophenylethylthiophosphonate (TRICHLORONAT)
O,O-Dimethyl-O-2,5-dichloro-4-bromophenylthiophosphate (BROMOPHOS)
O,O-Diethyl-O-2,5-dichloro-4-bromophenylthiophosphate (BROMOPHOS-ETHYL)
O,O-Dimethyl-O-(2,5-dichlor-4-iodophenyl)-thiophosphate (IODOFENPHOS)
4-tert. Butyl-2-chlorophenyl-N-methyl-O-methylamidophosphate (CRUFOMAT)
Dimethyl-p-(methylthio)phenylphosphate
O,O-Dimethyl-O-(3-methyl-4-methylmercaptophenyl)thiophosphate (FENTHION)
Isopropylamino-O-ethyl-O-(4-Methylmercapto-3-methylphenyl)phosphate
O,O-Diethyl-O-p-[(methylsulphinyl)phenyl]-thiophosphate (FENSULFOTHION)
O,O-Dimethyl-O-p-sulphamidophenylthiophosphate
O-[p-(Dimethylsulphamido)phenyl]O,O-dimethylthiophosphate (FAMPHUR)
O,O,O',O'-Tetramethyl-O,O'-thiodi-p-phenylenethiophosphate
O-(p-Chlorophenylazophenyl)O,O-dimethylthiophosphate (AZOTHOAT)
O-Ethyl-S-phenyl-ethyldithiophosphonate
O-Ethyl-S-4-chlorophenyl-ethyldithiophosphonate
O-Isobutyl-S-p-chlorophenyl-ethyldithiophosphonate
O,O-Dimethyl-S-p-chlorophenylthiophosphate
O,O-Dimethyl-S-(p-chlorophenylthiomethyl)-dithiophosphate
O,O-Diethyl-p-chlorophenylmercaptomethyl-dithiophosphate (CARBOPHENOTHION)
O,O-Diethyl-S-p-chlorophenylthiomethyl-thiophosphate
O,O-Dimethyl-S-(carbethoxy-phenylmethyl)dithiophosphate (PHENOTHOAT)
O,O-Diethyl-S-(carbofluorethoxy-phenylmethyl)-dithiophosphate
O,O-Dimethyl-S-(carbisopropoxy-phenylmethyl)-dithiophosphate O,O-Dimethyl-O-(alpha-methylbenzyl-3-hydroxycrotonyl)phosphate,
2-Chloro-1-(2,4-dichlorophenyl)vinyl-diethylphosphate (CHLORFENVINPHOS)
2-Chloro-1-(2,4,5-trichlorophenyl)vinyl-dimethylphosphate O-(2-Chloro-1-(2,5-dichlorophenyl)vinyl-O,O-diethyl-thiophosphate
Phenylglyoxylonitriloxime-O,O-diethylthiophosphate (PHOXIM)
O,O-Diethyl-O-(3-chloro-4-methyl-2-oxo-2-H-1-benzopyran-7-yl)-thiophosphate (COUMAPHOS)
O,O-Diethyl-7-hydroxy-3,4-tetramethylene-coumarinyl-thiophosphate (COUMITHOAT)
2,3-p-Dioxanedithiol-S,S,-bis(O,O-diethyldithiophosphate) (DIOXATHION)
2-Methoxy-4-H-1,3,2-benzodioxaphosphorine-2-sulphide
O,O-Diethyl-O-(5-phenyl-3-isooxyzolyl (sic)) thiophosphate
S-[(6-Chlor -2-oxo-3-benzoxazolinyl)methyl]O,O-diethyldithiophosphate (PHOSALON)
2-(Diethoxyphosphinylimino)-4-methyl-2,3-dithiolane
O,O-Dimethyl-S-[2-methoxy-1,3,4-thiadiazol-5-(4H)-onyl-(4)-methyl]dithiophosphate
Tris-(2-methyl-1-aziridinyl)-phosphine-oxide (METEPA)
O,O-Dimethyl-S-phthalimidomethyl-dithiophosphate
S-(2-Chloro-1-phthalimidoethyl)-O,O-diethyldithiophosphate
N-Hydroxynaphthalimido-diethylphosphate
Dimethyl-3,5,6-trichloro-2-pyridylphosphate
O,O,-Dimethyl-O-(3,5,6-trichloro-2-pyridyl)thiophosphate
O,O-Diethyl-O-(3,5,6-trichloro-2-pyridyl)thiophosphate
O,O-Diethyl-O-2-pyrazinylthiophosphate (THIONAZIN)
O,O-Diethyl-O-(2-isopropyl-4-methyl-6-pyrimidyl)thiophosphate (DIAZINON)
O,O-Diethyl-O-(2-quinoxylyl)thiophosphate
O,O-Dimethyl-S-(4-oxo-1,2,3-benzotriazin-3(4H)-ylmethyl) dithiophosphate (AZINPHOSMETHYL)
O,O-Diethyl-S-(4-oxo-1,2,3-benzotriazin-3(4H)-ylmethyl)-dithiophosphate (AZINPHOSETHYL)
S-[(4,6-Diamino-s-triazin-2-yl)methyl]-O,O-dimethyl-dithiophosphate (MENAZON)
S-[2-Ethylsulphonyl)ethyl]dimethylthiolphosphate (DIOXYDEMETON-S-METHYL)
Diethyl-S-[2-(ethylsulphinyl)ethyl]dithiophosphate (OXYDISULFOTON)
Bis-O,O-diethylthiophosphoric acid anhydride (SULFOTEP)
Dimethyl-1,3-di(carbomethoxy)-1-propen-2-yl-phosphate Dimethyl-(2,2,2-trichloro-1-butyroyloxyethyl)phosphonate (BUTONAT)
O,O-Dimethyl-O-(2,2-dichloro-1-methoxy-vinyl)phosphate
O,O-Dimethyl-O-(3-chloro-4-nitrophenyl)thiophosphate (CHLORTHION)
O,O-Dimethyl-O(or S)-2-(ethylthioethyl)thiophosphate (DEMETON-S-METHYL)
Bis-(dimethylamido)fluorophosphate (DIMEFOX)
2-(O,O-Dimethyl-phosphoryl-thiomethyl)-5-methoxypyrone-4
3,4-Dichlorobenzyl-triphenylphosphonium chloride
Dimethyl-N-methoxymethylcarbamoylmethyl-dithiophosphate (FORMOCARBAM)
O,O-Diethyl-O-(2,2-dichloro-1-chlorethoxyvinyl)-phosphate
O,O-Dimethyl-O-(2,2-dichloro-1-chloroethoxyvinyl)-phosphate
O-Ethyl-S,S-diphenyldithiolphosphate
O-Ethyl-S-benzyl-phenyldithiophosphonate
O,O-Diethyl-S-benzyl-thiolphosphate
O,O-Dimethyl-S-(4-chlorophenylthiomethyl)dithiophosphate (METHYLCARBOPHENOTHION)
O,O-Dimethyl-S-(ethylthiomethyl)dithiophosphate
Diisopropylaminofluorophosphate (MIPAFOX)
O,O-Dimethyl-S-(morpholinylcarbamoylmethyl)dithiophosphate (MORPHOTHION)
Bismethylamido-phenylphosphate
O,O-Dimethyl-S-(benzenesulphonyl)dithiophosphate
O,O-Dimethyl-(S and O)-ethylsulphinylethylthiophosphate
O,O-Diethyl-O-4-nitrophenylphosphate
O,O-Diethyl-S-(2,5-dichlorophenylthiomethyl)dithiophosphate (PHENDAPTON)
Triethoxy-isopropoxy-bis (thiophosphinyl)disulphide
O,O-Diethyl-O-(4-methyl-coumarinyl-7)-thiophosphate (POTASAN)
2-Methoxy-4H-1,3,2-benzodioxaphosphorine-2-oxide
Octamethylpyrophosphoramide (SCHRADAN)
Bis(dimethoxythiophosphinylsulphido)-phenylmethane 5-Amino-bis(dimethylamido)phosphinyl-3-phenyl-1,2,4-triazole (TRIAMIPHOS)
N-Methyl-5-(O,O-dimethylthiolphosphoryl)-3-thiavaleramide (VAMIDOTHION) and
N,N,N',N'-Tetramethyldiamidofluorophosphate (DIMEFOX)

CARBAMIC ACID DERIVATIVES

1-Naphthyl-N-methylcarbamate (CARBARYL) 2-Butinyl-4-chlorophenylcarbamate
4-Dimethylamino-3,5-xylyl-N-methylcarbamate
4-Dimethylamino-3-tolyl-N-methylcarbamate (AMINOCARB)
4-Methylthio-3,5-xylyl-N-methylcarbamate (METHIOCARB)
3,4,5-Trimethylphenyl-N-methylcarbamate
2-Chlorophenyl-N-methylcarbamate (CPMC)
5-Chlor-6-oxo-2-norbornane-carbonitrile-O-(methylcarbamoyl)-oxime
1-(Dimethylcarbamoyl)-5-methyl-3-pyrazolyl-N,N-dimethylcarbamate (DIMETILAN)
2,3-Dihydro-2,2-dimethyl-7-benzofuranyl-N-methylcarbamate (CARBOFURAN)
2-Methyl-2-methylthio-propionaldehyde-O-(methylcarbamoyl)-oxime (ALDICARB)
8-Quinaldyl-N-methylcarbamate and its salts
Methyl 2-isopropyl-4-(methylcarbamoyloxy)carbanilate
m-(1-Ethylpropyl)phenyl-N-methylcarbamate
3,5-Di-tert.butyl-N-methylcarbamate
m-(1-Methylbutyl)phenyl-N-methylcarbamate
2-Isopropylphenyl-N-methylcarbamate
2-sec.Butylphenyl-N-methylcarbamate
m-Tolyl-N-methylcarbamate
2,3-Xylyl-N-methylcarbamate
3-Isopropylphenyl-N-methylcarbamate
3-tert.Butylphenyl-N-methylcarbamate
3-sec.Butylphenyl-N-methylcarbamate
3-Isopropyl-5-methylphenyl-N-methylcarbamate (PROMECARB) 3,5-Diisopropylphenyl-N-methylcarbamate
2-Chlor-5-isopropylphenyl-N-methylcarbamate
2-Chloro-4,5-dimethylphenyl-N-methylcarbamate
2-(1,3-Dioxolan-2-yl)phenyl-N-methylcarbamate (DIOXYCARB)
2-(4,5-Dimethyl-1,3-dioxolan-2-yl)phenyl-N-methylcarbamate
2-(1,3-Dioxan-2-yl)phenyl-N-methylcarbamate 2-(1,3-Dithiolan-2-yl)phenyl-N-methylcarbamate
2-(1,3-Dithiolan-2-yl)phenyl-N,N-dimethylcarbamate
2-Isopropoxyphenyl-N-methylcarbamate (ARPROCARB)
2-(2-Propinyloxy)phenyl-N-methylcarbamate
2-(2-Propinyloxy)phenyl-N-methylcarbamate
3-(2-Propinyloxy)phenyl-N-methylcarbamate
2-Dimethylaminophenyl-N-methylcarbamate
2-Diallylaminophenyl-N-methylcarbamate
4-Diallylamino-3,5-xylyl-N-methylcarbamate (ALLYXICARB)
4-Benzothienyl-N-methylcarbamate
2,3-Dihydro-2-methyl-7-benzofuranyl-N-methylcarbamate
3-Methyl-1-phenylpyrazol-5-yl-N,N-dimethylcarbamate
1-Isopropyl-3-methylpyrazol-5-yl-N,N-dimethylcarbamate (ISOLAN)
2-N',N'-Dimethylcarbamoyl)-3-methylpyrazol-5-yl-N,N-dimethylcarbamate
2-Dimethylamino-5,6-dimethylpyrimidin-4-yl-N,N-dimethylcarbamate
3-Methyl-4-dimethylaminomethyleneiminophenyl-N-methylcarbamate
3-Dimethylamino-methyleneiminophenyl-N-methylcarbamate
1-Methylthio-ethylimino-N-methylcarbamate (METHOXYMYL)
2-Methylcarbamoyloxyimino-1,3-dithiolane
5-Methyl-2-methylcarbamoyloxyimino-1,3-oxathiolane
2-(1-Methoxy-2-propoxy)phenyl-N-methylcarbamate
2-(1-Butin-3-yl-oxy)phenyl-N-methylcarbamate
3-Methyl-4-(dimethylamino-methylmercapto-methyleneimino) phenyl-N-methylcarbamate
1,3-Bis(carbamoylthio)-2-(N,N-dimethylamino)-propane hydrochloride
5,5-Dimethylhydroresorcinoldimethylcarbamate
2-[Propargylethylamino]-phenyl-N-methylcarbamate
2-[Propargylmethylamino]-phenyl-N-methylcarbamate
2-[Dipropargylamino]-phenyl-N-methylcarbamate
3-Methyl-4-[dipropargylamino]-phenyl-N-methylcarbamate
3,5-Dimethyl-4-[dipropargylamino]-phenyl-N-methylcarbamate
2-[Allyl-isopropylamino]-phenyl-N-methylcarbamate and
3-[Allyl-isopropylamino]-phenyl-N-methylcarbamate.

CHLORINATED HYDROCARBONS

γ-Hexachlorocyclohexane [Gammexane; Lindane; γ HCH]
1,2,4,5,6,7,8,8-Octachloro-3α,4,7,7α'-tetrahydro-4,7-methyleneindane [Chlordan]
1,4,5,6,7,8,8-Heptachloro-3α,4,7,7α-tetrahydro-4,7-methyleneindane [Heptachlor]
1,2,3,4,10,10-Hexachloro-1,4,4α,5,8,8α-hexahydro-endo-1,4-exo-5,8-dimethanonaphthalene [Aldrin]
1,2,3,4,10,10-Hexachlor-6,7-epoxy-1,4,4α,5,6,7,8,8α,9-octahydro-exo-1,4-endo-5,8-dimethanonaphthalene [Dieldrin]
ditto, endo-endo- [Endrin]
6,7,8,9,10,10-Hexachloro-1,5,5α,6,9,9α-hexahydro-6,9-methano-2,3,4-benzo[e]-dioxa-thiepene-3-oxide [Endosulfan]
Chlorinated camphor [Toxaphen]
Decachlorooctahydro-1,3,4-metheno-2H-cyclobuta[e d] pentalen-2-one
Dodecachlorooctahydro-1,3,4-metheno-1H-cyclobuta[c d] pentalene [Mirex]
Ethyl-1,1α,3,3α,4,5,5α,5α,6-decachlorooctahydro-2-hydroxy-1,3,4-metheno-1H-cyclobuta[c d]pentalene-2-laevulinate
Bis(pentachloro-2,4-cyclopentadien-1-yl)
Dinoctone-o
1,1,1-Trichloro-2,2-bis(p-chlorophenyl)ether [DDT]
Dichlorodiphenyl-dichlorethane [TDE]
Di(p-chlorophenyl)-trichloromethylcarbinol [Dicofol]
Ethyl-4,4'-dichlorophenylglycollate [Chlorobenzylate]
Ethyl-4,4'-dibromobenzylate [Bromobenzylate]
Isopropyl-4,4'-dichlorobenzylate
1,1,1-Trichloro-2,2 -bis(p-methoxyphenyl)ethane [Methoxychlor]
Diethyl-diphenyl-dichlorethane
Decachloropentacyclo(3,3,2, $0^{2,6}$, $0^{3,9}$, $0^{7,10}$)decan-4-one [Chlordecon].

NITROPHENOLS AND DERIVATIVES 4,6-Dinitro-6-methylphenol Na salt [dinitrocresol]
Dinitrobutylphenol-2,2',2''-triethanolamine salt
2-Cyclohexyl-4,6-dinitrophenol [Dinex]
2-(1Methylheptyl)-4,6-dinitrophenyl-crotonate [Dinocap]
2 sec.-Butyl-4,6-dinitrophenyl-3-methyl-butenoate [Binapacryl]
2 sec.-Butyl-4,6-dinitrophenyl-cyclopropionate and
2 sec.-Butyl-4,6-dinitrophenyl-isopropyl-carbonate [Dinobuton]

VARIOUS SUBSTANCES

Sabadilla
Rotenon
Cevadin
Veratridin
Ryania
Pyrethrin
3-Allyl-2-methyl-4-oxo-2-cyclopenten-1-yl-chrysanthemumate (Allethrin)
6-Chloropiperonyl-chrysanthemumate (Barthrin)
2,4-Dimethylbenzyl-chrysanthemumate (Dimethrin)
2,3,4,5-Tetrahydrophthalimidomethyl-chrysanthemumate
(5-Benzyl-3-furyl)-methyl-2,2-dimethyl-3-(2-methylpropanyl) cyclopropanecarboxylate
Nicotine
Bacillus thuringiensis Berliner
Dicyclohexylcarbodiimide
Diphenyldiimide
4-Chlorobenzyl-4-chlorophenylsulphide [Chlorobensid]
Creosote oil
6-Methyl-2-oxo-1,3-dithiolo-[4,5-b]-quinoxaline [Quinomethionat]
(I)-3-(2-Furfuryl)-2-methyl-4-oxocyclopent-2-enyl(I)-(cis+trans)chrysanthemum-monocarboxylate [Furethrin]
2-Pivaloyl-indane-1,3-dione [Pindon]
2-Fluorethyl(4-bisphenyl)acetate
2-Fluoro-N-methyl-N(1-naphthyl)-acetamide
Pentachlorophenol and salts
2,2,2-Trichloro-N-(pentachlorophenyl)-acetimidoyl chloride
N'-(4-Chloro-2-methylphenyl)-N,N-dimethylformamidine (Chlorphenamidine)

4-Chlorobenzyl-4-fluorophenyl-sulphide (Fluorobenside)
5,6-Dichloro-1-phenoxycarbanyl-2-trifluoromethyl-benzimidazole (Fenozaflor)
Tricyclohexyl-tin hydroxide
2-Thiocyanatoethyl-lauric acid ester
β-Butoxy-β'-thiocyanatodiethyl-ether
Isobornyl-thiocyanatoacetate
p-Chlorophenyl-p-chlorobenzenesulphonate (Ovex)
2,4-Dichlorophenyl-benzenesulphonate
p-Chlorophenyl-benzenesulphonate (Fenson)
p-Chlorophenyl-2,4,5-trichlorophenylsulphone (Tetradifon)
p-Chlorophenyl-2,4,5-trichlorophenylsulphide (Tetrasul)
Methyl bromide
p-Chlorophenyl-phenylsulphone
p-Chlorobenzyl-p-chlorophenylsulphide (Chlorobenside)
4-Chlorophenyl-2,4,5-trichlorophenylazosulphide
2(p-tert.-Butylphenoxy-1-methylethyl-2-chlorethyl-sulphite
2-(p-tert.-Butylphenoxy)cyclohexyl-2-propinyl-sulphite
4,4'-Dichloro-N-methylbenzenesulphonanilide
N-(2-Fluoro-1,1,2,2-tetrachlorethylthio)-methanesulphonanilide
2-Thio-1,3-dithiolo-(4,5-6)quinoxaline (Thioquinox)
Chloromethyl-p-chlorophenylsulphone
1,3,6,8-Tetranitrocarbazole and
Prop-2-ynyl-(4-t-butylphenoxy)-cyclohexylsulphite (Propargil).

For application, the compounds of formula (I) can be processed to give dusting agents, emulsion concentrates, granules, dispersions, sprays, solutions or suspensions of the usual formulation, which in the technology of application forms part of the general knowledge.

In order to manufacture directly sprayable solutions of the compounds of general formula (I), it is for example possible to use mineral oil fractions of high to medium boiling range, such as diesel oil or kerosene, coal tar oils and oils of vegetable or animal origin, as well as hydrocarbons, such as alkylated naphthalenes or tetrahydronaphthalene, optionally with the use of xylene mixtures, cyclohexanols, ketones and also chlorinated hydrocarbons such as trichlorethane and tetrachlorethane, trichlorethylene or trichlorobenzenes and tetrachlorobenzenes. Advantageously, organic solvents of boiling point above 100°C are used.

Aqueous application forms are particularly appropriately prepared from emulsion concentrates, pastes or wettable spraying powders by adding water. Possible dispersing agents are non-ionic products, for example condensation products of aliphatic alcohols, amines or carboxylic acids having a long-chain hydrocarbon radical of about 10 to 20 carbon atoms and ethylene oxide, such as the condensation product of octadecyl alcohol and 25 to 30 mols of ethylene oxide, or that of soja fatty acid and 30 mols of ethylene oxide, or that of technical oleylamine and 15 mols of ethylene oxide or that of dodecylmercaptan and 12 mols of ethylene oxide. Amongst the anionic dispersing agents which can be employed, there may for example be mentioned: the sodium salt of dodecyl alcohol sulphuric acid ester, the sodium salt of dodecylbenzenesulphonic acid, the potassium or triethanolamine salt of oleic acid or of abietic acid or of mixtures of these acids, or the sodium salt of a petroleum-sulphonic acid. Possible cationic dispersing agents are quaternary ammonium compounds, such as for example cetyl-pyridinium bromide, or dihydroxyethylbenzyldodecylammonium chloride.

In order to manufacture dusting agents and scattering agents, talc, kaolin, bentonite, calcium carbonate or calcium phosphate, but also charcoal, cork powder, wood flour and other materials of vegetable origin can be employed as solid carriers. It is also very appropriate to manufacture preparations in a granular form. The various use forms can be provided in the customary manner with addition of substances which improve the distribution, adhesion, rain resistance or penetrating power; such substances are, for example, fatty acids, resins, glue, casein or aligates (sic !).

The content of active substance in the agents described above is between 0.1 and 95% and at the same time it should be mentioned that in the case of application from aircraft or by means of other suitable application instruments concentrations of up to 99.5% or even pure active substances are employed.

The application of these agents in the veterinary field takes place in accordance with the customary processes, for example according to the spraying, pouring, dusting and fumigating process. The so-called dipping process, in which the animal is driven through a solution or dispersion of the agent, is also effective.

In the case of the spraying, pouring and dipping process, the application preparations preferably contain 0.05% to 0.5% of active substance.

EXAMPLE 1

4-Chloro-2-methyl-phenyl-S-methyl-dithiocarbamate 750 g of 5-chloro-2-toluidine, 600 ml of methanol, 600 ml of concentrated ammonia and 472 g of carbon disulphide are stirred for 24 hours at 0°–20°C and 550 ml of dimethylsulphate are then added dropwise at 0°–10°C. The mixture is stirred for 10 hours at room temperature, the product is precipitated by adding about 3 l of water, and the resulting precipitate is filtered off and dried in vacuo up to 50°C. Yield 86.5%, melting point 101°–106°C. Recrystallisation of the crude product from a chloroform/petroleum ether mixture yields the compound of formula

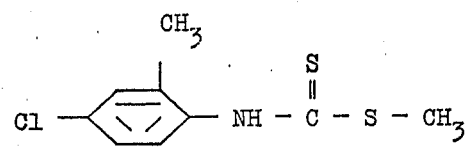

4-Chloro-2-methyl-phenyl-S-ethyl-dithiocarbamate

If instead of dimethylsulphate, diethylsulphate is used, the compound of formula

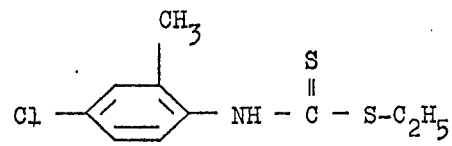

(Active Substance No. 2)

is obtained. Melting point after recrystallisation from petroleum ether, 57° – 59°C.

The following compounds were manufactured analogously:

3. Cl—⟨⟩—NH—C(=S)—S—C₃H₇ (i)
   CH₃

Melting point 106° – 107°C

4. Cl—⟨⟩—NH—C(=S)—S—CH₂—C(=O)—OCH₃
   CH₃

Melting point 118° – 120°C

5. Cl—⟨⟩—NH—C(=S)—S—CH₂—S—CH₃
   CH₃

Melting point 61° – 62°C

6. Cl—⟨⟩—NH—C(=S)—S—CH₂—C(Cl)=CH₂
   CH₃

Melting point 89° – 91°C

7. Cl—⟨⟩—NH—C(=S)—S—C₃H₇(n)
   CH₃

$n_D^{25°C}$ 1.6250

8. Cl—⟨⟩—NH—C(=S)—S—CH₂—CH=CH₂
   CH₃

Melting point 59° – 61°C

9. Cl—⟨⟩—NH—C(=S)—S—CH₂—CH=CH—CH₃
   CH₃

$n_D^{24°C}$ 1.6355

10. Cl—⟨⟩—NH—C(=S)—S—C₄H₉(n)
    CH₃

Melting point 53°C

11. Cl—⟨⟩—NH—C(=S)—S—CH₂—CH=CH—Cl
    CH₃

$n_D^{24°C}$ 1.6486

12.

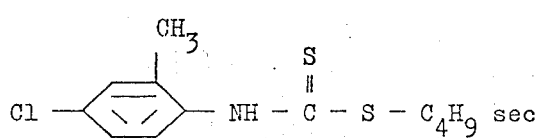

Melting point 76 - 77°C

Melting point 76° - 77°C

13.

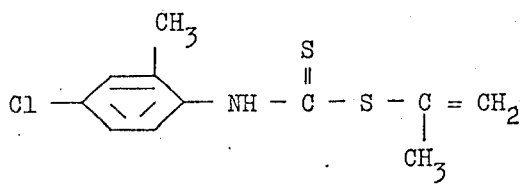

Melting point 74° - 76°C (tertiary)

14.

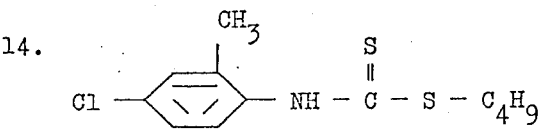

Melting point 105° - 107°C

15.

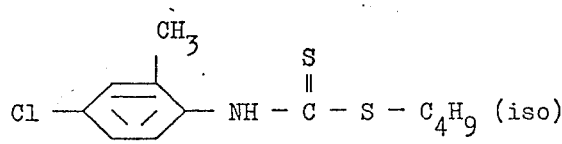

$n_D^{24°C}$ 1.6575

16. 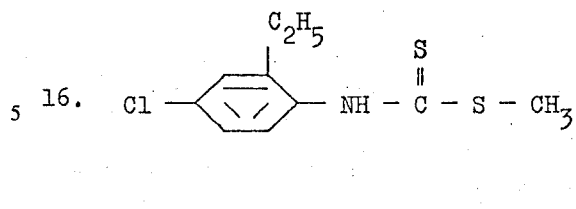

Melting point 89° - 91°C

17. 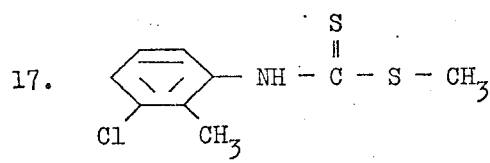

Melting point 109° - 110°C

18. 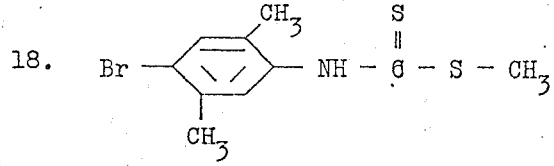

Melting point 121° - 122°C

19. 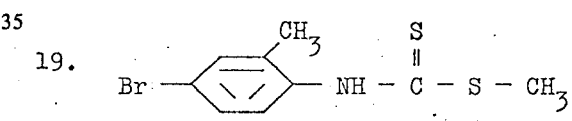

Melting point 99° - 101°C

EXAMPLE 2

4-n-Butylphenyl-S-isopropyl-dithiocarbamate 57.3 g of 4-n-butylphenylisothiocyanate, 23 g of isopropylmercaptan and 0.3 g of triethylamine were mixed and left to stand for 24 hours. On adding 100 ml of hexane, the product crystallised out. Filtration and rinsing with petroleum ether yields the compound of formula

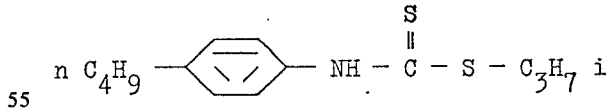

Melting point 82° - 83°C (Active Substance No. 20) in a pure form.

EXAMPLE 3

Dusting Agents

Equal parts of an active substance of formula I and of precipitated silica are finely ground. Dusting agents preferably containing 1-6 % of active substance can be manufactured therefrom by mixing with kaolin or talc.

Spraying powders

In order to manufacture a spraying powder the following components are mixed and finely ground:

50 parts of active substance according to the present invention
20 parts of highly adsorbent silica
25 parts of Bolus alba (kaolin)
1.5 parts of sodium 1-benzyl-2-stearyl-benzimidazole-6,3'-disulphonate, and
3.5 parts of a reaction product of p-tert.octylphenol and ethylene oxide.

Emulsion concentrate

Easily soluble active substances can also be formulated as an emulsion concentrate according to the following instruction:
20 parts of active substance of formula I
70 parts of xylene, and
10 parts of a mixture of a reaction product of an alkylphenol with ethylene oxide and calcium dodecylbenzenesulphonate
are mixed. On dilution with water to the desired concentration, a sprayable emulsion results.

Granules 7.5 g of one of the active substances of formula I are dissolved in 100 ml of acetone and the acetone solution thus obtained is added to 92 g of granular attapulgite. The whole is well mixed and the solvent is stripped off in a rotary evaporator. Granules containing 7.5% of active substance are obtained.

EXAMPLE 4 a. *Rhipicephalus bursa.*

Five adult, hungry ticks were counted out into a glass test tube and dipped for 1–2 minutes into 2 ml of an aqueous emulsion from a dilution series with 100, 10, 1 and 0.1 ppm of test substance. The test tube was closed with a standard cottonwool pad and inverted so that the active substance emulsion could be taken up by the cottonwool. The evaluation took place after 2 weeks.

Two repeats were run for each experiment.
Compound No. 1 achieved 100% mortality at 100 ppm.
Compound No. 2 achieved 100% mortality at 100 ppm.
Compound No. 3 achieved 100% mortality at 100 ppm.
Compound No. 4 achieved 100% mortality at 100 ppm.
Compound No. 6 achieved 100% mortality at 100 ppm.
Compound No. 7 achieved 100% mortality at 100 ppm.
Compound No. 8 achieved 100% mortality at 10 ppm.
Compound No. 9 achieved 100% mortality at 50 ppm.

b. *Boophilus microplus* (larvae)

A test series and two repeats, in each case using 20 OP-resistant larvae, was carried out with a similar dilution series, analogously to method (a). (The resistance relates to the toleration of diazinone). 100% mortality was found after 2 weeks at the following limiting concentrations:

| Compound No. 1 | 10 ppm |
| Compound No. 2 | 10 ppm |
| Compound No. 4 | 50 ppm |
| Compound No. 6 | 1 ppm |
| Compound No. 7 | 1 ppm |
| Compound No. 8 | 5 ppm |
| Compound No. 9 | 5 ppm | c. *Dermanyssus gallinae*

The test was carried out analogously to method (a) with 20 mites. The evaluation took place after 72 hours.
100% mortality was achieved at the following limiting concentrations:

| Compound No. 1 | 100 ppm |
| Compound No. 2 | 100 ppm |
| Compound No. 3 | 100 ppm |
| Compound No. 4 | 100 ppm |
| Compound No. 6 | 100 ppm |
| Compound No. 7 | 50 ppm |
| Compound No. 8 | 100 ppm |
| Compound No. 9 | 100 ppm | d. Shield-backed lice (Diaspidae)

*Aspidiotus hederae* were grown on cucumber in the laboratory. Young females (200 specimens) were treated, after the second shedding had taken place, with an emulsion manufactured according to Example 2, containing 0.1% of active substance No. 1. The application took place by applying the emulsified active substance with a soft hair brush.

Counting 200 shield lice after 18 days showed 94% mortality.

EXAMPLE 5

*Chilo supressalis*

Active substances No. 1 and No. 2 were tested for their bait action against *Chilo supressalis*.
After 5 days the following results were achieved:

| Active Substance | Mortality at 800 ppm |
| --- | --- |
| No. 1 | 80 % |
| No. 2 | 80 % |

What we claim is:
1. A compound of the formula

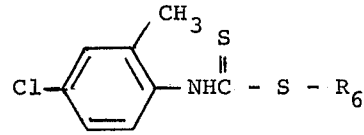

in which $R_6$ is alkyl of from 1 to 4 carbon atoms, alkenyl of 3 or 4 carbon atoms or a chloroalkenyl of 3 or 4 carbon atoms.

2. The compound according to claim 1 of the formula

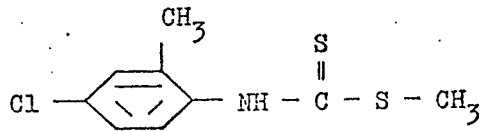

3. The compound according to claim 1 of the formula

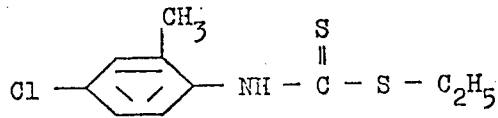

4. The compound according to claim 1 of the formula

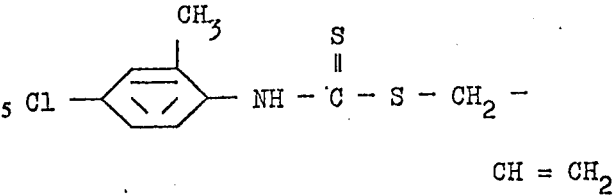

5. The compound according to claim 1 of the formula
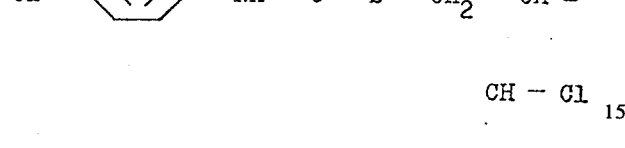
6. The compound according to claim 1 of the formula
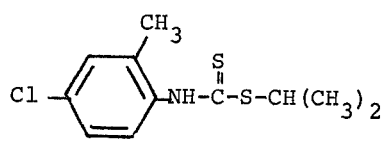
7. The compound according to claim 1 of the formula
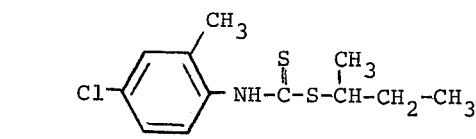
8. The compound according to claim 1 of the formula
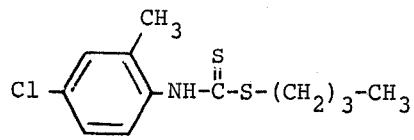
9. The compound according to claim 1 of the formula
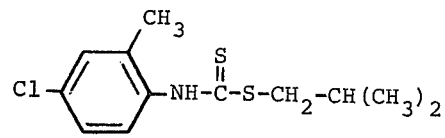
* * * * *